United States Patent [19]

Heidemann et al.

[11] Patent Number: 5,128,790
[45] Date of Patent: Jul. 7, 1992

[54] OPTICAL CABLE TELEVISION TRANSMISSION SYSTEM

[75] Inventors: Rolf Heidemann, Tamm; Heinz G. Krimmel, Stuttgart; Berthold Wedding, Korntal, all of Fed. Rep. of Germany

[73] Assignee: Alcatel N. V., Amsterdam, Netherlands

[21] Appl. No.: 759,730

[22] Filed: Sep. 12, 1991

Related U.S. Application Data

[63] Continuation of Ser. No. 514,877, Apr. 24, 1990, abandoned.

[30] Foreign Application Priority Data

Apr. 25, 1989 [DE] Fed. Rep. of Germany ... P3913520.9

[51] Int. Cl.$^5$ ............................................. H04J 14/02
[52] U.S. Cl. ..................................................... 359/132
[58] Field of Search ........................ 359/124, 125, 132

[56] References Cited

U.S. PATENT DOCUMENTS

| | | | |
|---|---|---|---|
| 3,939,341 | 2/1976 | Graves | 455/619 |
| 4,135,202 | 1/1979 | Cutler | 358/86 |
| 4,210,803 | 7/1980 | Ih | 455/610 |
| 4,512,025 | 4/1985 | Frankel et al. | 375/36 |

OTHER PUBLICATIONS

Mendis, I.V.C., Thung, T. T., and Selvan, B., Electronics Letters, vol. 24, No. 7, "20 km Single Mode Optical Fibre System For Multichannel Video," Mar. 31, 1988, pp. 442-443.

IEEE Transactions On Communications, Band COM-29, Nr. 6, Jun. 1981, New York H. J. Matt U. K. Fussgaenger "Integrated Broad-Band Communication Using Optical Networks-Results of an Experimental Study".

Proceedings Of The Ire, Band 44, Nr. 12, Dec. 1956, New York J. F. Honey U. D. K. Weaver "An Introduction to Single-Sideband Communications".

*Primary Examiner*—Edward L. Coles, Sr.
*Assistant Examiner*—L. Pascal
*Attorney, Agent, or Firm*—Ware, Fressola, Van Der Sluys & Adolphsson

[57] ABSTRACT

To transmit a frequency-division multiplex signal occupying a broad frequency band, e.g., the 40–440 MHz cable television frequency band, over an optical-fiber transmission link, in the transmitter, the whole frequency band to be transmitted is converted by single-side-band amplitude modulation of a high-frequency carrier $f_0$ to a higher-frequency band, e.g., 840–1240 MHz, which, referred to its lowest frequency, is less than one octave wide. Second-order intermodulations products, which usually result during electric-to-optical conversion, thus fall into unoccupied frequency ranges. At the receiving end, corresponding demodulation is performed employing either carrier recovery or a locally generated carrier. In a preferred embodiment, the frequency band to be transmitted is converted to the higher frequency band in several subbands.

20 Claims, 4 Drawing Sheets

OPTICAL CABLE TELEVISION TRANSMISSION SYSTEM

This is a continuation of copending application(s) Ser. No. 514,877 now abandon filed on Apr. 24, 1990.

BACKGROUND OF THE INVENTION

1. Field of the Invention

The present invention relates to a system for optically transmitting a frequency-division multiplex signal occupying a broad frequency band which is necessary in cable television systems where a plurality of signals each containing a television or radio program have to be transmitted.

2. Description of the Prior Art

A system of the kind, above-mentioned in which the frequency-division multiplex signal is composed of four television signals and several radio, telephone, and data signals, is known from "IEEE Transactions on Communications", Vol. COM-29, No. 6, June 1981, pp. 868 to 885 (FIG. 13 on p. 878). It occupies a frequency band extending from 54 to 108 MHz. The frequency-division multiplex signal is formed by frequency-modulating different carriers which are chosen to lie within a band only one octave wide.

For the number of television and radio programs to be transmitted in present-day cable television systems (at least 35 television programs and 30 VHF radio programs), this prior art system is not sufficient.

In the prior Patent Application DE-OS 39 07 495, it is proposed to use the frequency-division multiplex signal provided by the KTV head station (KTV=German abbreviation for cable television), which occupies a frequency band from 40 to 440 MHz, directly, i.e., without any conversion, to intensity-modulate the semiconductor laser.

It has turned out that second-, third-, and higher-order intermodulation products are caused by such modulation, with the second-order products dominating. Therefore, the semiconductor laser may only be driven with a small signal. As a result, the system tolerates an optical link loss of only few dB.

SUMMARY OF THE INVENTION

It is, therefore, the object of the invention to provide a system suitable for optically transmitting the aforementioned broadband frequency-division multiplex signal.

This object is attained by a system comprising a transmitter unit including an intensity-modulated semiconductor laser and a receiver unit which reconverts the transmitted optical signal into the frequency-division multiplexed signal, wherein the transmitter unit includes a modulator which converts the frequency band to a transmission frequency band by single-sideband amplitude modulation of a carrier, that the transmission frequency band, or the transmission frequency band and the carrier, is/are used to intensity-modulate the semiconductor laser, and that the receiver unit includes a modulator for reconverting the transmission frequency band to the original frequency band.

The essential advantage of the invention lies in the fact that the original frequency band is converted to a frequency band which, referred to its lowest frequency, is less than one octave wide, so that second-order intermodulation products have frequencies which fall into the unoccupied band between frequency O and the carrier frequency and into ranges above twice the carrier frequency, and can thus be easily eliminated in the receiving unit. As a result, the laser can be driven harder and a higher link loss can be tolerated. Another advantage is that through the conversion of the signals to the higher-frequency band, low frequency bands become free and can be used for other telecommunication services (telephony, data transmission).

DETAILED DESCRIPTION OF THE PREFERRED EMBODIMENT

The invention will be described with reference to a cable television distribution network, but it is to be understood that it covers all applications in which a plurality of signals of different frequency occupying a broad frequency band, i.e., a broadband frequency-division multiplex signal, have to be transmitted from a point A to one or more points B.

Figure 1:
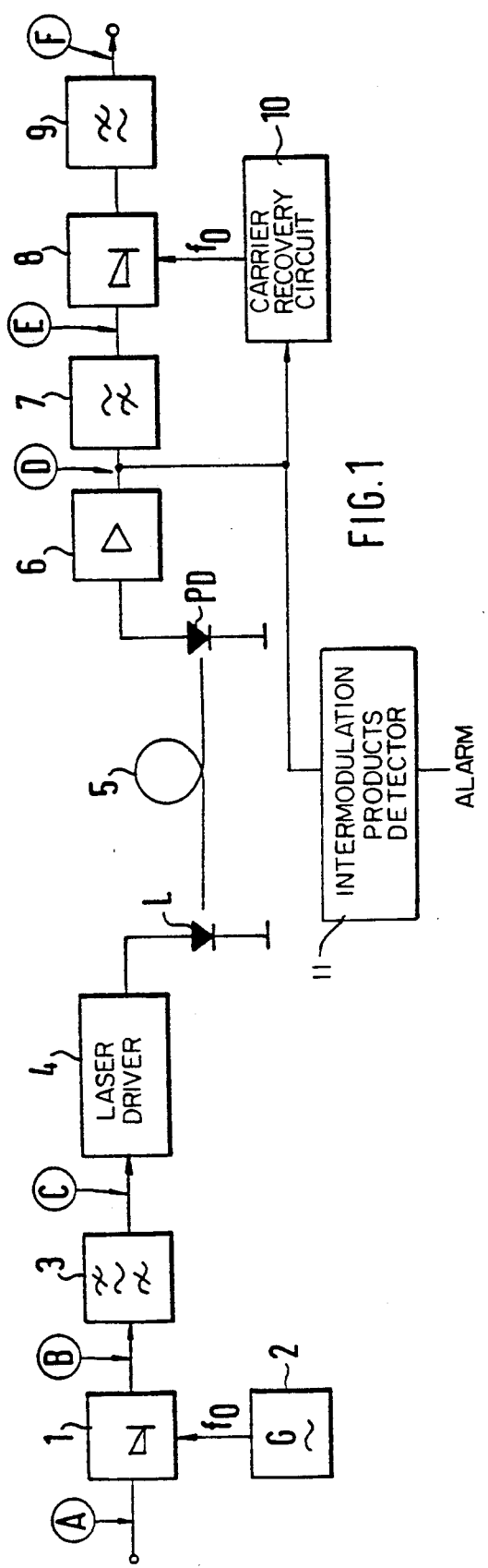
FIG. 1 is a block diagram of a first embodiment of the system in accordance with the invention.

In the system of FIG. 1, a band of signals of different frequency, i.e., for television and sound broadcast transmissions according to the frequency allocation plan of the 440-MHz coaxial-cable television system of the German Bundespost, with a bandwidth from 40 to 440 MHz, is applied to the input of a modulator 1. This modulator receives a carrier of frequency $f_O$, in this example 800 MHz, from a carrier-frequency generator 2 and effects double-sideband amplitude modulation of the carrier. A filter 3 succeeding the modulator 1 filters the upper sideband out of the output signal from the modulator and feeds it to the input of a laser driver 4.

The "laser driver" is a conventional drive circuit for a semiconductor laser L used as a light source for the optical-fiber transmission link. The laser driver ensures that the semiconductor laser is intensity-modulated with its input signal.

If the filter 3 passes the upper sideband as mentioned above, it is a band-pass filter for the upper sideband. Instead of the upper sideband, the lower sideband could be used. The filter 3 would then have to be a band-pass filter for the lower sideband. In either case, it is a single-sideband filter.

Thus, the modulator 1, which may also be referred to as a mixer, the generator 2, and the single-sideband filter 3 together constitute a single-sideband modulator. The latter converts its input frequency band, the BKTV band, to a higher-frequency band by single-sideband amplitude modulation of a high-frequency carrier. This higher-frequency band will henceforth be called "transmission frequency band", because it is the frequency band formed for the purpose of optical transmission, i.e., the frequency band used to intensity-modulate the semiconductor laser L.

Figure 2:
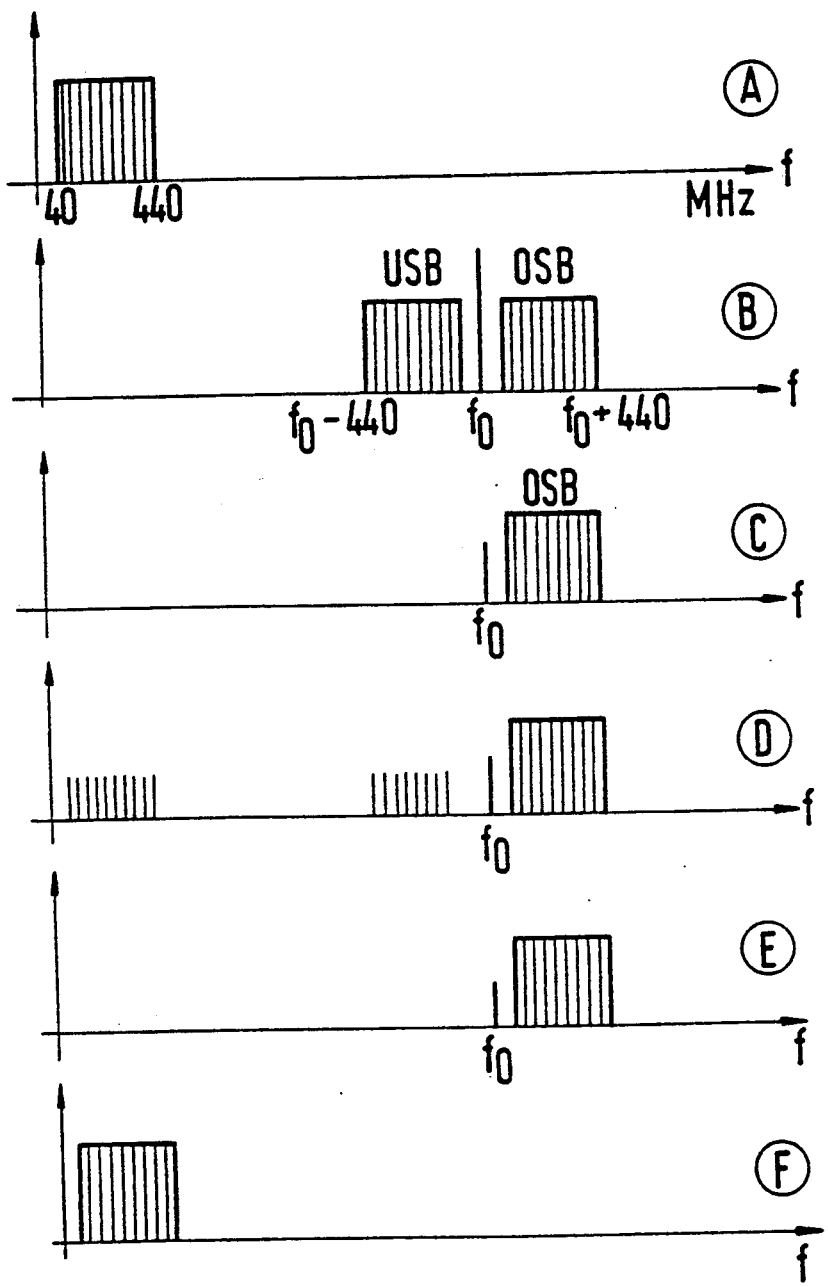
FIG. 2 shows the signal spectra at different points of the block diagram of FIG. 1.

The operation of the transmitter unit of FIG. 1 will now be explained in greater detail with the aid of FIG. 2. FIG. 2 shows the signal spectra (designated by capital letters) at different points of the block diagram of FIG. 1 (designated by corresponding letters). The letter A denotes the spectrum at the input of the modulator 1, which has a bandwidth from 40 to 440 MHz in the example being described. By mixing this spectrum with the carrier of frequency $f_O$ in the modulator 1, double-sideband amplitude modulation with a lower frequency band USB and an upper frequency band OSB is obtained, as illustrated by the spectrum B. During this modulation, the carrier may be suppressed or may still be present in the output signal of the modulator, depending on the design of the mixer. Spectrum B illustrates the latter case. C is the spectrum at the output of the single-sideband filter 3, which contains only the upper sideband, and in which the carrier is reduced. This signal spectrum with the carrier is used to intensity-modulate the semiconductor laser L in FIG. 1 if the carrier also is to be transmitted to the receiver unit.

The semiconductor laser L of the system of FIG. 1 sends an optical signal corresponding to the electrical signal with the spectrum C over a fiber-optic link 5 to the receiver unit, in which an optical receiver consisting of a photodiode PD and an amplifier 6 converts the optical signal to the electric signal whose spectrum is designated D in FIG. 2. This corresponds to the spectrum C obtained by single-sideband amplitude modulation but includes intermodulation products, as shown below $f_O$. To remove these intermodulation products, the spectrum D is filtered in a single-sideband filter 7, which provides the spectrum E, in which the carrier is suppressed as far as possible with a reasonable amount of circuitry. A demodulator 8, which could also be referred to as a mixer, mixes the spectrum E with the carrier $f_O$, and a subsequent low-pass filter 9 with a cutoff frequency of 500 MHz provides at its output the transmitted signal, reconverted to the original frequency band, the BKTV band, as is illustrated in FIG. 2 by spectrum F.

It may be desirable to detect the intermodulation products shown in FIG. 2 in spectrum D, particularly when the intermodulation products exceed a predetermined threshold value. Accordingly, an intermodulation products detector 11 is connected to the output of amplifier 6 for detecting the intermodulation products and for providing an alarm signal when the products exceed the predetermined threshold value. The intermodulation products detector 11 includes a power detector for the intermodulation products, which detector provides the alarm signal when the intermodulation products exceed the predetermined value.

As shown in FIG. 1, the carrier $f_O$ needed for the demodulator 8 is obtained by being recovered from the received signal. This necessitates a carrier recovery circuit 10, a few examples of which will be given later. The carrier $f_O$ is transmitted from the transmitter unit to the receiver unit of the system by being not suppressed during single-sideband amplitude modulation, as explained above. If, however, the modulator 1 and the single-sideband filter have the property of suppressing the carrier, the latter may be obtained from the output of the generator 2, suitably amplified or attenuated, and added to the output signal from the single-sideband filter 3.

There are applications where it is not absolutely necessary for the BKTV band appearing at the output of the receiver unit (point F in FIG. 3) to be exactly equal in frequency to the BKTV band fed into the transmitter unit (point A in FIG. 1), but where a frequency shift by $\Delta f$ can be tolerated.

That is the case, for example, if no further signal processing, e.g., modulation, multiplexing, etc., is required at the output of the receiver unit for subsequent long-distance transmission, but if the frequency band is applied directly to the terminal equipment for which its signals are destined, e.g., television receivers. Such terminal equipment tolerates the frequency shift. The receiver unit, too, tolerates a certain shift of the frequency or phase of the carrier. In such cases, therefore, carrier recovery can be dispensed with.

Figure 3:
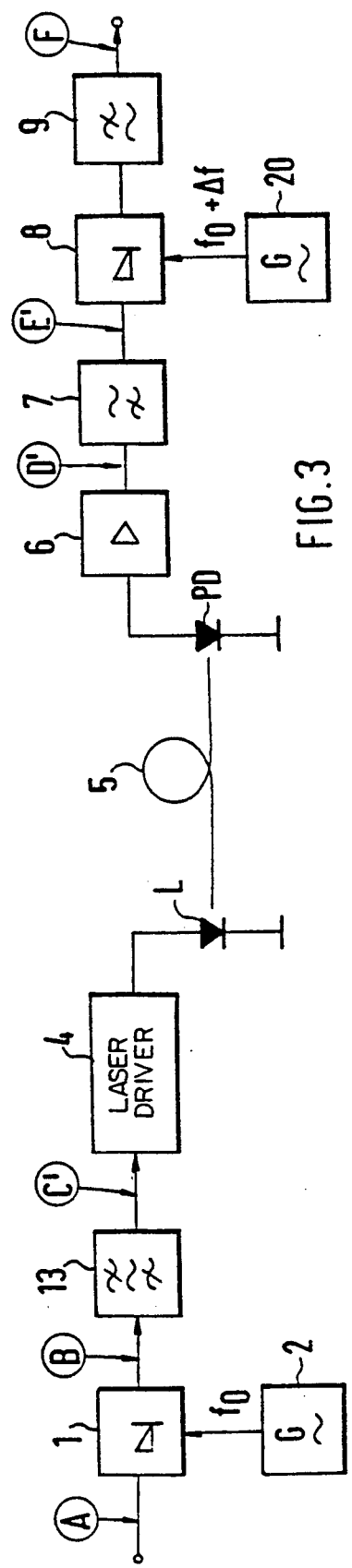
FIG. 3 is a block diagram of a second embodiment of the system in accordance with the invention.

A modification of the system for such cases is shown in FIG. 3. It differs from FIG. 1 in that the carrier is not recovered from the received signal but generated in the receiver unit by a free-running generator 20. The generator 20 generates a carrier which agrees with the carrier generated by the generator 2 of the transmitter unit except for an inaccuracy $\Delta f$. The transmitter unit includes a single-sideband filter 13 which suppresses the carrier as far as possible. The spectra appearing at points C', D', and E' differ from the corresponding spectra of FIG. 2 only in that the carrier is not present. The remainder of the system of FIG. 3 is identical to the system of FIG. 2 and, therefore, requires no further explanation.

An embodiment of the invention which relates to the transmitter unit of FIG. 1 or FIG. 3 will now be explained with the aid of FIG. 4. The BKTV band is applied in parallel to four different range filters $B_1$ through $B_4$, each of which filters a specific range out of the BKTV band. The ranges are chosen so that the resulting subbands, referred to their lower cutoff frequency, are less than one octave wide, and that each of the signals contained in the BKTV band lies in one of the subbands. (Unoccupied ranges of the BKTV band may be suppressed). The BKTV band is thus divided into four subbands. This division may also take into account the division into ranges which is present in the BKTV band. The range filters $B_1$ through $B_4$ may divide the BKTV band into the following four subbands, for example:

subband 1 = 47–68 MHz
subband 2 = 88–108 MHz
subband 3 = 125–230 MHz
subband 4 = 230–438 MHz Each of the range filters $B_1$ through $B_4$ is followed by a modulator $M_1$ through $M_4$, which could also be referred to as a mixer, and which mixes its input frequency band with the carrier generated by the carrier generator 2, as described with reference to FIG. 1. Each of the modulators is followed by a single-sideband filter $E_1$ through $E_4$, which suppresses the lower sideband.

Each modulator and the single-sideband filter succeeding it thus constitutes a modulator which converts the frequency band applied to it to a higher-frequency band by single-sideband amplitude modulation of the high-frequency carrier. This higher-frequency band is amplified in one of the amplifiers $V_1$ through $V_4$, and all four amplified frequency bands are combined in a passive power combiner 40, so that a composite signal with the spectrum C of FIG. 2 is obtained. This composite signal is used to intensity-modulate the laser. As in the embodiments of FIGS. 1 and 3, in the transmitter unit of FIG. 4, too, the carrier may be suppressed or passed, or added directly from the output of the generator.

Figure 4:
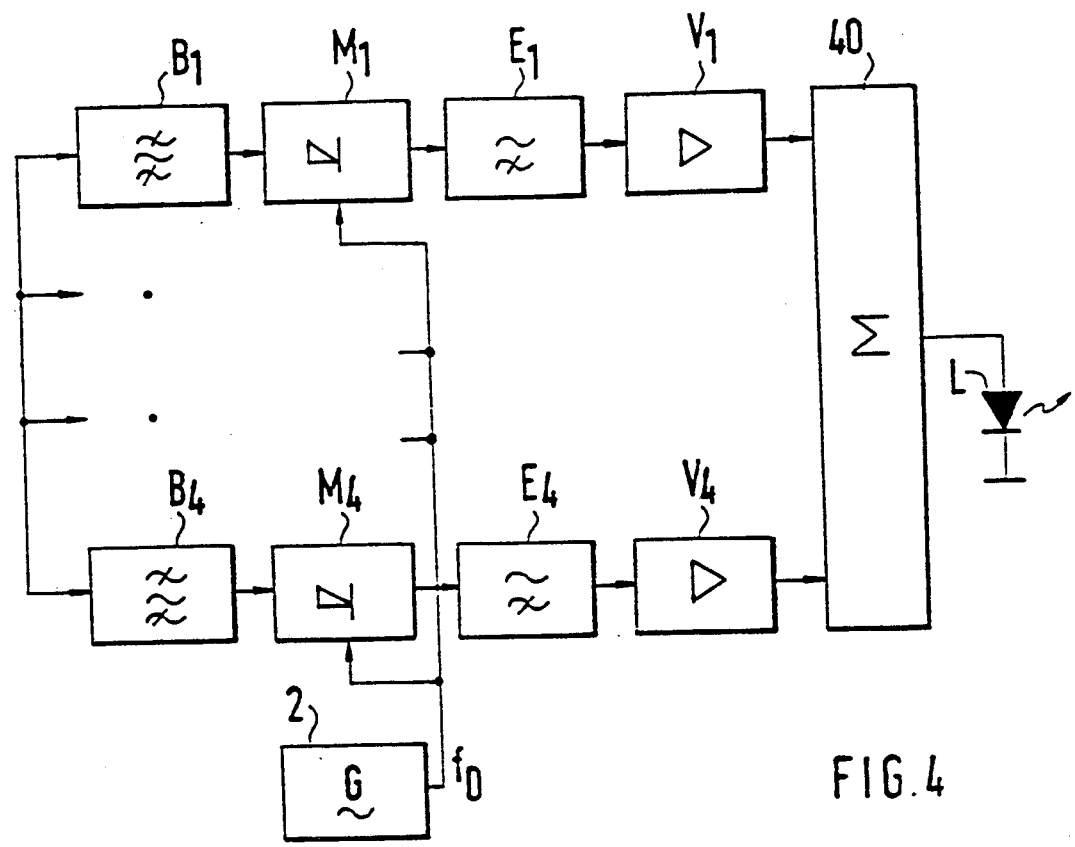
FIG. 4 is a block diagram of an embodiment of the invention in which the frequency band to be transmitted is converted to the transmission frequency band in several parts.

The transmitter unit of FIG. 4, too, is based on the principle of the invention explained with the aid of FIG. 1, namely the conversion of the frequency band to be transmitted to a transmission frequency band by single-sideband amplitude modulation of a high-frequency carrier. It only has the special feature that the frequency band is separated into several parts and, consequently, converted to the transmission frequency band in several parts.

The advantage of the transmitter unit of FIG. 4 lies in the fact that second-order intermodulation products of any signal of the composite input signal of a modulator lie in a frequency range which contains no other signals from the composite input signal of the same modulator. No input signal of a modulator can thus interfere with intermodulation products of any other input signal of the same modulator.

A further advantage is that the four largely independent branches can be equipped to meet different reliability or quality requirements. The division into several branches also allows step-by-step extension of the system in accordance with growing communications needs of the subscribers connected to the system.

Figure 5:
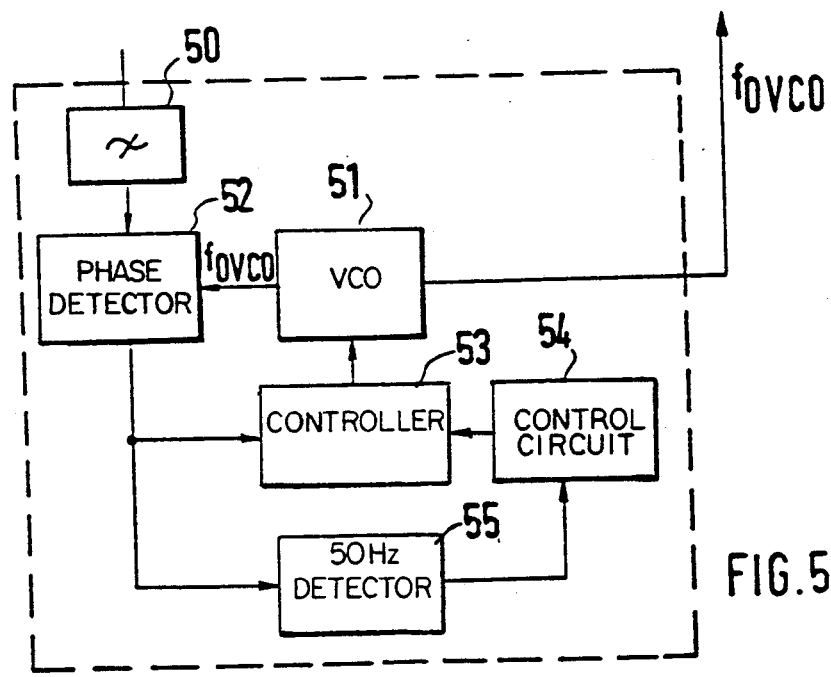
FIG. 5 shows a first embodiment of the carrier recovery circuit of FIG. 1 using phase-locked loop.

A first embodiment of the carrier recovery circuit 10, shown as a block in FIG. 1, will now be explained with the aid of FIG. 5. It is essentially a conventional phase-locked loop (PLL), consisting of a voltage-controlled oscillator (VCO) 51, a phase detector 52, and a controller 53. The input signal is the spectrum D of FIG. 2, which appears at the output of the optical receiver. It is applied to the input of a prefilter 50, which attenuates the signal spectrum more than 10 dB below the level of the carrier. A surface-acoustic-wave filter of medium Q (a few hundred) is suitable for this purpose. The prefilter 50 provides the spectrum containing the transmitted carrier to the phase detector 52. The phase detector compares the carrier received from the prefilter 50 with the wave generated by the oscillator 51 and generates a control quantity for the controller 53, which controls the oscillator 51 so that the carrier wave generated by the latter has the same frequency as the received carrier $f_O$.

The phase-locked loop described so far must be designed so that any residual modulation by the signal at $f_O+40$ MHz is reliably suppressed. In the unlocked condition of the phase-locked loop, particularly with no input signal applied to the phase-locked loop from the prefilter 50 (e.g., in the event of a transmission-link interruption or when the transmitter is off), the oscillator 51 could oscillate at a frequency located near the frequency of the picture carrier of a television signal at $f_O+40$ MHz. The oscillator could then synchronize with the frequency of this picture carrier.

To prevent this, a control circuit 54 is provided which may be referred to as a "lock-in aid". In the unlocked condition of the phase-locked loop, it controls the controller 53 in such a way that the frequency $f_{OVCO}$ of the oscillator VCO is definitely below the (predetermined) frequency $f_O$. (If the lower sideband is used, $f_{OVCO}$ must be above $f_O$.) If the phase-locked loop then receives from the prefilter 50 a reference signal $f_O$ which lies in the capture range of the loop (i.e., if the difference between $f_O$ and $f_{OVCO}$ is less than the capture range), it will lock with this reference signal $f_O$, and the undesired synchronization described above is excluded.

If, for one reason or another, the phase-locked loop should lock with a picture carrier after all, the phase detector 52 will provide a signal in which a 50-Hz component (field frequency) dominates. A 50-Hz detector 55 is provided which monitors the output of the phase detector and, when detecting the component, delivers a control signal to the lock-in aid 54 causing the latter to initiate a resynchronization.

Figure 6:
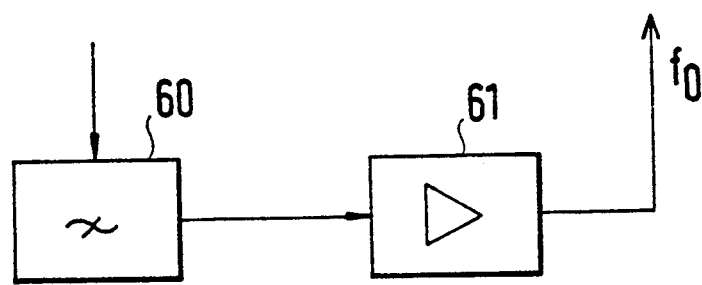
FIG. 6 shows a second embodiment of the carrier recovery circuit of FIG. 1 using a filter and a carrier amplifier.

A second embodiment of a carrier recovery circuit is shown in FIG. 6. Here, the spectrum containing the transmitted carrier is applied to a high-Q filter 60 which attenuates the residual signal below the level of the carrier $f_O$, and a frequency-selective carrier amplifier 61 amplifies the carrier contained in the output of the filter 60. Attenuation of the residual signal more than 50 dB below the level of the carrier $f_O$ can be achieved with a surface-acoustic-wave filter and a selective carrier amplifier. This circuit is much simpler than that of FIG. 5 but has the disadvantage that the tolerance of $f_O$ in the transmitter unit must be very small, and that the high-Q filter must have high accuracy and aging stability.

Figure 7:
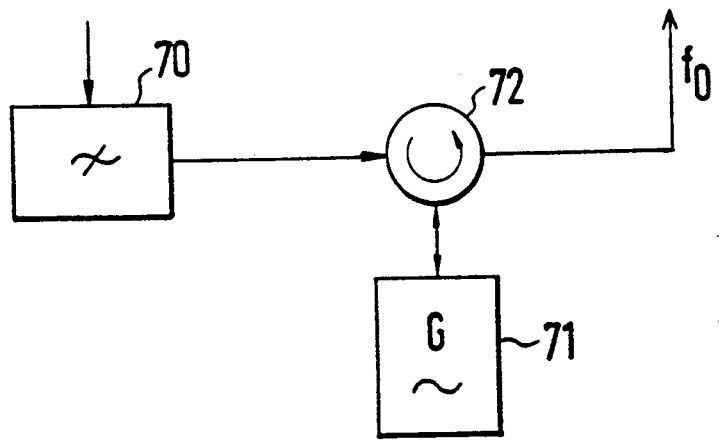
FIG. 7 shows a third embodiment of the carrier recovery circuit of FIG. 1 using an injection-locked oscillator.

A third embodiment is shown in FIG. 7. Here, too, the spectrum containing the transmitted carrier is applied to a prefilter 70, which attenuates the residual signal below the level of the carrier. An oscillator 71 is injection-locked to the frequency $f_O$ of the received carrier by the output signal from the prefilter via an Y circulator 72.

As an example of a suitable carrier frequency $f_O$, 800 MHz was specified in the foregoing description. The carrier can have any frequency by which the frequency band to be transmitted can be converted to a transmission frequency band which, referred to its lowest frequency, is less than one octave wide, i.e., whose highest frequency is less than twice the lowest frequency.

The analog multichannel transmission system described must have a high signal-to-noise capability, namely higher than 52 dB. Therefore, any nonlinearities of parts of the system (laser driver, semiconductor laser, including feedback from the fiber-optic link, receiver front end with low-noise amplifier) are especially critical. It is therefore desirable to monitor the critical parts of the system during operation and generate an alarm signal in the event of a malfunction.

It is to be expected that due to aging or malfunctions of such parts, second-order intermodulation products will increase especially rapidly. According to the invention, the receiver unit includes a power detector for the intermodulation products which provides an alarm signal when the intermodulation products exceed a preset threshold value. This eliminates the need to transmit pilot tones for monitoring the system. Advantageously, the signal to be monitored is the output signal of the preamplifier stage, also called "front end", of the optical receiver.

In the above examples, the modulator, which effects the single-sideband amplitude modulation of the carrier, is shown as a mixer followed by a single-sideband filter. Other types of modulators effecting such modulation, e.g., modulators using the so-called phasing method or the pilot-tone method (according to Weaver) as are described, for example, in Meinke-Gundlach, "Taschenbuch der Hochfrequenztechnik", 4th Edition, Vol. 3, Springer-Verlag Berlin, Heidelberg, New York, Tokio, 1986, pp. 01 to 06, are also suitable, of course.

What is claimed is:

1. System for optically transmitting a frequency-division multiplex signal occupying a broad frequency band, comprising a transmitter unit including an intensity-modulated semiconductor laser and a receiver unit which reconverts the transmitted optical signal into the frequency-division multiplex signal, characterized in that the transmitter unit includes a modulator (1, 2, 3; $B_i$, $M_i$, $E_i$) which converts the frequency band (A) to a transmission frequency band (C) by single-sideband amplitude modulation of an electrical carrier ($f_O$), that the transmission frequency band (C), is used to intensity-modulate the semiconductor laser (L), and that the receiver unit includes a demodulator (7, 8, 9) for reconverting the transmission frequency band (C) to the original frequency band (A).

2. A system as claimed in claim 1, characterized in that the modulator (1, 2, 3) of the transmitter unit does not suppress the carrier during modulation, and that the receiver unit includes a carrier recovery circuit (10) which recovers the carrier ($f_O$) from the received signal and feeds it to the demodulator (8, 9) for reconverting the transmission frequency band (C) (FIG. 1).

3. A system as claimed in claim 2, characterized in that the carrier recovery circuit (10) includes a phase-locked loop (51, 52, 53) and a control circuit (54) which, to avoid incorrect synchronization, controls the phase-locked loop at the beginning of a synchronization process in such a way that the oscillator of the phase-locked loop oscillates at a predetermined frequency (FIG. 5).

4. A system as claimed in claim 3, characterized in that the carrier recovery circuit includes a detector (55) for a modulated signal formed in case of incorrect synchronization which, when detecting said modulated signal, delivers to the control circuit (54) a signal initiating a resynchronization (FIG. 5).

5. A system as claimed in claim 2, characterized in that the carrier recovery circuit (10) consists of a high-Q filter (60) for the carrier and a carrier amplifier (61) (FIG. 6).

6. A system as claimed in claim 2, characterized in that the carrier recovery circuit consists of a filter (70) for the carrier and an injection-locked oscillator (71) (FIG. 7).

7. A system as claimed in claim 1 characterized in that the receiver unit includes a detector for intermodulation products caused by nonlinearities whcih is fed with the electric signal obtained in the receiver unit, and which provides an alarm signal when the intermodulation products exceed a predetermined threshold value.

8. A system as claimed in claim 2, characterized in that the frequency (fO) of the carrier is chosen so that the transmission frequency band (C,C') is less than one octave wide, based on a lowest frequency of the transmission frequency band (C,C').

9. A system as claimed in claim 2, characterized in that the modulator ($B_1$ to $B_4$, $M_1$ to $M_4$, $E_1$ to $E_4$, $V_1$ to $V_4$, 40) of the transmitter unit converts the frequency band to be transmitted (A) to the transmission frequency band in several parts (FIG. 4).

10. A system as claimed in claim 1, characterized in that the modulator (1, 2, 3) of the transmitter unit suppresses the carrier ($f_O$) during modulation and the transmitter unit transmits no carrier to the receiver unit, and that the receiver unit includes a carrier generator (20) which supplies to the demodulator (8) for reconverting the transmission frequency band (C') a carrier having approximately the same frequency as the carrier used in the transmitter unit (FIG. 3).

11. A system as claimed in claim 1, characterized in that the frequency (fO) of the carrier is chosen so that the transmission frequency band (C,C') is less than one octave wide based on a lowest frequency of the transmission frequency band (C,C').

12. A system as claimed in claim 1, characterized in that the modulator ($B_1$ to $B_4$, $M_1$ to $M_4$, $E_1$ to $E_4$, $V_1$ to $V_4$, 40) of the transmitter unit converts the frequency band to be transmitted (A) to the transmission frequency band in several parts (FIG. 4).

13. A system as claimed in claim 12, characterized in that the transmitter unit includes several filters ($B_1$ to $B_4$) which divide the frequency band to be transmitted (A) into several subbands, that the modulator of the transmitter unit consists of several modulators ($M_1$, $E_1$ to $M_4$, $E_4$) which convert the subbands to higher-frequency bands by single-sideband amplitude modulation, and that the transmitter unit includes a combiner (40) which combines the several higher-frequency bands to form the transmission frequency band (C) for intensity-modulating the semiconductor laser (L) (FIG. 4).

14. A system as claimed in claim 13, characterized in that each of the subbands is less than one octave wide, based on a lowest frequency of each of said subbands.

15. A system as claimed in claim 1, characterized in that the modulator (1, 2, 3) of the transmitter unit suppresses the carrier during modulation but adds it to its output signal and the receiver unit includes a carrier recovery circuit (10) which recovers the carrier ($f_O$) from the received signal and feeds it to the demodulator (8, 9) for reconverting the transmission frequency band (C) (FIG. 1).

16. System for optically transmitting a frequency-division multiplex signal occupying a broad frequency band, comprising a transmitter unit including an intensity-modulated semiconductor laser and a receiver unit which reconverts the transmitted optical signal into the frequency-division multiplex signal, characterized in that the transmitter unit includes a modulator (1, 2, 3; $B_i$, $M_i$, $E_i$) which converts the frequency band (A) to a transmission frequency band (C) by single-sideband amplitude modulation of a carrier ($f_O$), that the transmission frequency band (C) and the carrier ($f_O$), are used to intensity-modulate the semiconductor laser (L), and that the receiver unit includes a demodulator (7, 8, 9) for reconverting the transmission frequency band (C) to the original frequency band (A).

17. A system as claimed in claim 16, characterized in that the modulator (1, 2, 3) of the transmitter unit does not suppress the carrier during modulation and that the receiver unit includes a carrier recovery circuit (10) which recovers the carrier ($f_O$) from the received signal and feeds it to the demodulator (8, 9) for reconverting the transmission frequency band (C) (FIG. 1).

18. A system as claimed in claim 16, characterized in that the modulator (1, 2, 3) of the transmitter unit suppresses the carrier ($f_O$) during modulation and the transmitter unit transmits no carrier to the receiver unit, and that the receiver unit includes a carrier generator (20) which supplies to the demodulator (8) for reconverting the transmission frequency band (C') a carrier having approximately the same frequency as the carrier used in the transmitter unit (FIG. 3).

19. A system as claimed in claim 16, characterized in that the modulator ($B_1$ to $B_4$, $M_1$ to $M_4$, $E_4$, $V_1$ to $V_4$, 40) of the transmitter unit converts the frequency band to be transmitted (A) to the transmission frequency band in several parts (FIG. 4).

20. A system as claimed in claim 16, characterized in that the receiver unit includes a detector for intermodulation products caused by nonlinearities which is fed with the electric signal obtained in the receiver unit, and which provides an alarm signal when the intermodulation products exceed a predetermined threshold value.

* * * * *

UNITED STATES PATENT AND TRADEMARK OFFICE
CERTIFICATE OF CORRECTION

PATENT NO. : 5,128,790

DATED : July 7, 1992

INVENTOR(S) : Rolf Heidemann, Heinz G. Krimmel; Berthold Wedding

It is certified that error appears in the above-identified patent and that said Letters Patent is hereby corrected as shown below:

Column 8, line 67, "($B_1$ to $B_4$, $M_1$ to $M_4$, $E_4$, $V_1$ to $V_4$, 40)" should be
--($B_1$ to $B_4$, $M_1$ to $M_4$, $E_1$ to $E_4$, $V_1$ to $V_4$, 40)--.

Signed and Sealed this

Tenth Day of August, 1993

Attest:

MICHAEL K. KIRK

*Attesting Officer*  *Acting Commissioner of Patents and Trademarks*